US008687846B2

(12) United States Patent
Shimizu et al.

(10) Patent No.: US 8,687,846 B2
(45) Date of Patent: Apr. 1, 2014

(54) IMAGE PROCESSING APPARATUS, IMAGE PROCESSING METHOD AND COMPUTER READABLE INFORMATION RECORDING MEDIUM

(75) Inventors: Masayoshi Shimizu, Kawasaki (JP); Hiroyuki Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 102 days.

(21) Appl. No.: 13/137,447

(22) Filed: Aug. 16, 2011

(65) Prior Publication Data

US 2012/0128202 A1  May 24, 2012

(30) Foreign Application Priority Data

Nov. 19, 2010  (JP) .................................. 2010-259517

(51) Int. Cl.
*G06K 9/36*    (2006.01)
(52) U.S. Cl.
USPC ......................................................... 382/103
(58) Field of Classification Search
None
See application file for complete search history.

(56) References Cited

U.S. PATENT DOCUMENTS

| | | | | |
|---|---|---|---|---|
| 6,430,222 | B1* | 8/2002 | Okada ....................... | 375/240.03 |
| 7,463,284 | B2 | 12/2008 | Tamamura | |
| 7,533,805 | B1* | 5/2009 | Enright et al. ................ | 235/379 |
| 2001/0035870 | A1* | 11/2001 | Takeuchi et al. .............. | 345/630 |
| 2004/0042640 | A1* | 3/2004 | Ikeda et al. .................... | 382/115 |
| 2006/0182177 | A1* | 8/2006 | Thomson et al. ......... | 375/240.16 |
| 2008/0025605 | A1* | 1/2008 | Suino .......................... | 382/173 |
| 2008/0187234 | A1 | 8/2008 | Watanabe et al. | |
| 2008/0232715 | A1 | 9/2008 | Miyakawa et al. | |
| 2008/0317289 | A1* | 12/2008 | Oyaizu ........................ | 382/107 |
| 2009/0010551 | A1* | 1/2009 | Matsuda ....................... | 382/228 |
| 2009/0103621 | A1* | 4/2009 | Numata et al. ........... | 375/240.16 |
| 2010/0092045 | A1* | 4/2010 | Zimmer et al. ............... | 382/113 |
| 2010/0118163 | A1* | 5/2010 | Matsugu et al. ......... | 348/231.99 |
| 2010/0232646 | A1* | 9/2010 | Takeuchi ...................... | 382/103 |
| 2011/0019013 | A1* | 1/2011 | Lin et al. .................... | 348/208.4 |

FOREIGN PATENT DOCUMENTS

| | | |
|---|---|---|
| CN | 1777238 | 5/2006 |
| JP | 2005-101837 | 4/2005 |
| JP | 2007-272459 | 10/2007 |
| JP | 4142732 | 6/2008 |
| JP | 2009-65619 | 3/2009 |
| JP | 4553942 | 7/2010 |
| JP | 2010-232710 | 10/2010 |
| WO | 2010/100677 A1 | 9/2010 |

OTHER PUBLICATIONS

Jianbo Shi et al., "Good Features to Track", IEEE Conference on Computer Vision and Pattern Recognition, pp. 593-600, Jun. 1994.
Chinese Patent Office Action dated Dec. 4, 2013 in Chinese Patent Application No. 201110259661.2.

* cited by examiner

*Primary Examiner* — Stephen R Koziol
*Assistant Examiner* — Delomia Gilliard
(74) *Attorney, Agent, or Firm* — Staas & Halsey LLP

(57) ABSTRACT

An image processing apparatus includes an obtaining part configured to obtain a plurality of images including a photographing object photographed by a photographing part; a determination part configured to detects a shift in position between a first image and a second image included in the plurality of images obtained by the obtaining part, and determine whether the first image is suitable for being superposed to the second image; a selection part configured to select a certain number of images from the plurality of images based on a determination result of the determination part; and a synthesis part configured to synthesize the certain number of images selected by the selection part.

15 Claims, 19 Drawing Sheets

CALCULATE MOTION VECTORS

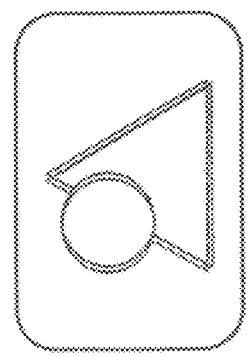
FIG.1A
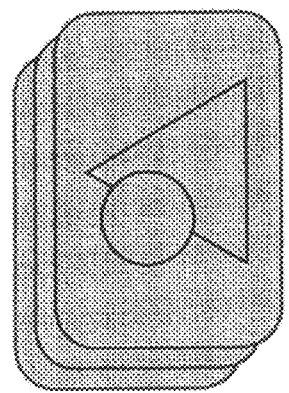
FIG.1B
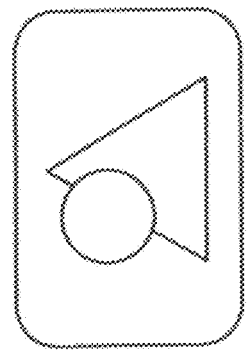
FIG.1C

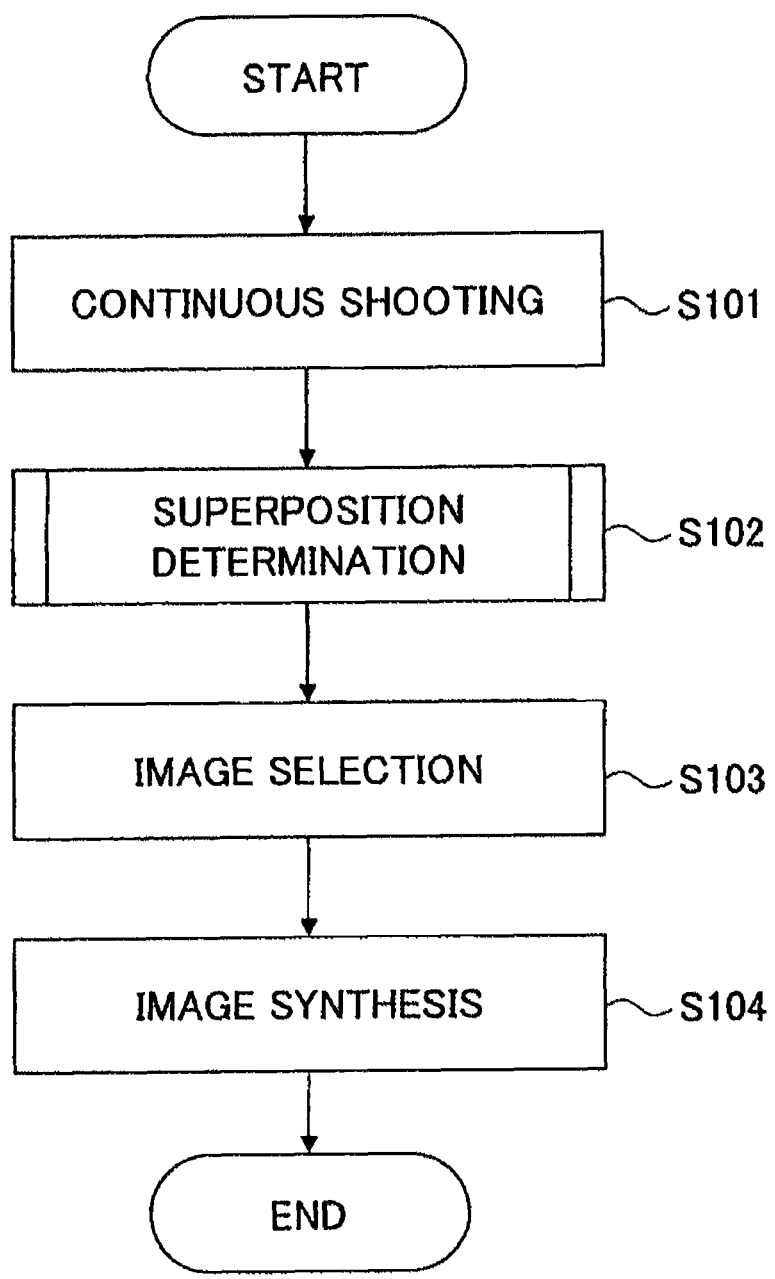

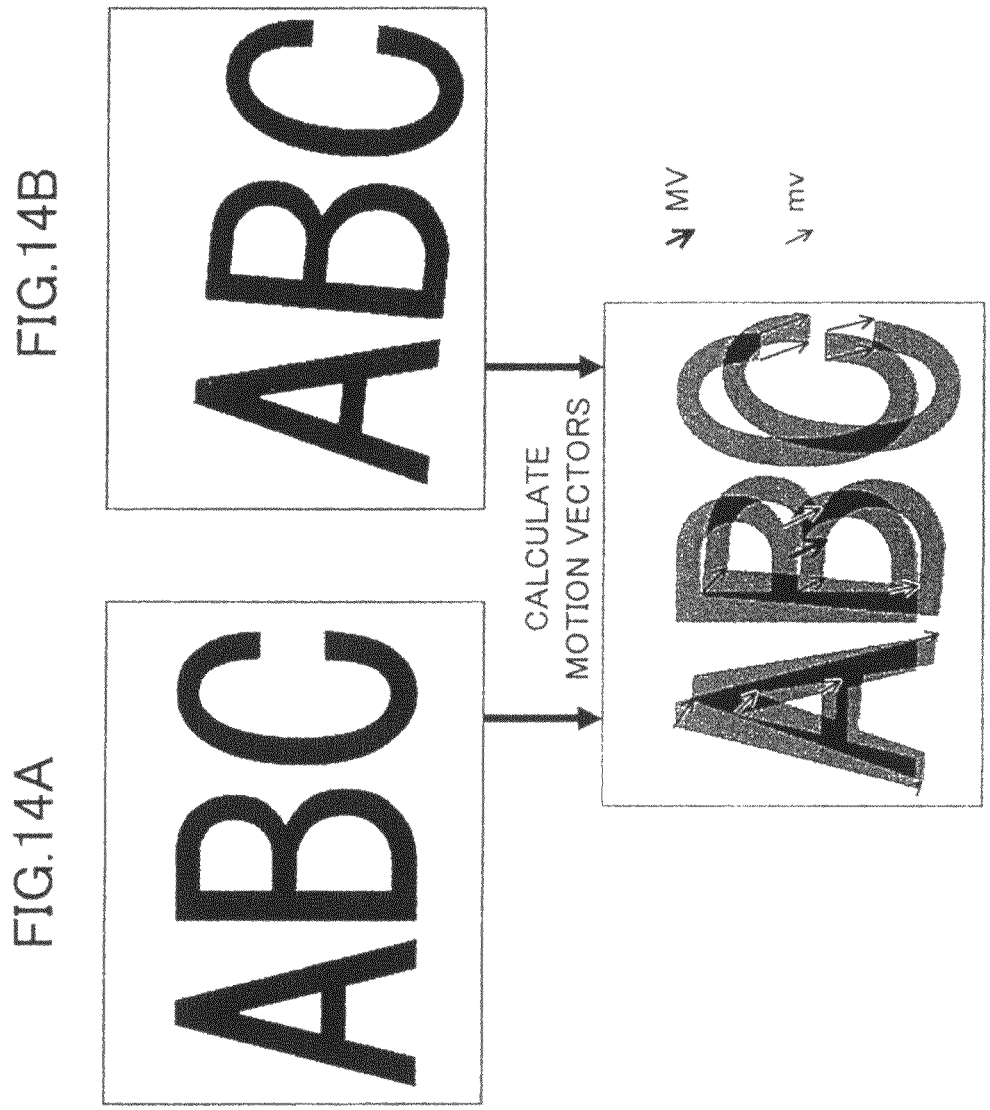

CALCULATE MOTION VECTORS

↘ MV

↘ mv

SUPERPOSE USING AVERAGE MOTION VECTOR

CALCULATE MOTION VECTORS

↘ MV
↘ mv

SUPERPOSE USING AVERAGE MOTION VECTOR

IMAGE PROCESSING APPARATUS, IMAGE PROCESSING METHOD AND COMPUTER READABLE INFORMATION RECORDING MEDIUM

CROSS-REFERENCE TO RELATED APPLICATIONS

This application is based upon and claims the benefit of priority of the prior Japanese Patent Application No. 2010-259517, filed on Nov. 19, 2010, the entire contents of which are incorporated herein by reference.

FIELD

The embodiments discussed herein is directed to an image processing apparatus, an image processing method and a computer readable information recording medium.

BACKGROUND

Recently, along with the spread of digital cameras or such, it becomes possible to obtain images superior in image quality thanks to digital image processing. For example, in a photographing apparatus such as a digital camera, a correction process such as an image stabilizer function or a noise removal function is mounted, and thus, image quality of an image taken through photographing by the photographing apparatus has been improved.

As a method of image stabilization, there is a method of optically carrying out image stabilization and a method of carrying out image stabilization by image processing. The former method is such that blurring is corrected mechanically, an optical system is moved, and thus, image stabilization is achieved. This method is used for an apparatus having a mounting space for mounting related mechanisms. In contrast thereto, the later method is such that image stabilization is achieved by image processing. Therefore, this method is suitable for an apparatus for which a mounting space is limited.

For example, in a digital camera or a cellular phone with a camera function, images continuously taken with a short exposure time are synthesized (superposed). Influence of blurring associated with a motion of the camera or such is small in the images thus taken with the short exposure time. However, in these images, the amount of light is small. Therefore, the images obtained through continuous shooting are synthesized, and an image having reduced noise and controlled blurring associated with the motion of the camera or such is generated.

FIGS. 1A, 1B and 1C illustrate the related art. FIG. 1A depicts an image such that since an exposure time is long, a blur amount is large, and consequently, the image is blurred. FIG. 1B depicts images taken through continuous shooting with a short exposure time. These images have been taken with the short exposure time, and thus, a blurring amount is small. However, since a sufficient amount of light may not be obtained, the images are dark.

FIG. 1C depicts an image obtained from superposing the images of FIG. 1B. It is possible to compensate insufficiency of the amount of light by superposing the plurality of images.

In this technique of image stabilization by image processing, basic processes include a position adjustment process and a superposition process to be carried out on purl images. When the position adjustment process is not properly carried out, image degradation such that an image obtained from the superposition process may look as if it is blurred, or such.

One reason why the position adjustment process is not properly carried out can be, for example, as follows. Since position adjustment is carried out basically by using parallel translation in many cases, it may not be possible to properly carry out position adjustment on images taken with a motion of the camera including rotation. The reason why parallel translation is basically used to carry out position adjustment is that it is possible to reduce a data processing load in comparison to a case of carrying out a rotation process.

Therefore, in order to obtain a satisfactory synthesized image, for example, a position change is obtained from a signal output of a photographing device during exposure, image stabilization is carried out as a result of images being synthesized based on the position change, and image data of an image area that has not been synthesized is corrected (see Japanese Laid-Open Patent Application No. 2005-101837 (Patent Document 1)).

Further, a relative displacement between two images of an associated plurality of images is obtained, images having low reliability in the relative displacement are not used for a superposition process, images having high reliability in the relative displacement are synthesized, and thus, proper image stabilization is carried out (see Japanese Laid-Open Patent Application 2007-272459 (Patent Document 2)).

SUMMARY

One embodiment of the present disclosure is an arrangement including an obtaining part configured to obtain a plurality of images including a photographing object photographed by a photographing part; a determination part configured to detect a shift in position between a first image and a second image included in the plurality of images obtained by the obtaining part, and determine whether the first image is suitable for being used to superpose with the second image; a selection part configured to select a certain number of images from the plurality of images based on a determination result of the determination part; and a synthesis part configured to synthesize the certain number of images selected by the selection part.

The object and advantages of the disclosure will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1A, 1B and 1C illustrate the related art;

FIG. 9 is a flowchart depicting one example of image processing in the embodiment 1;

FIGS. 14A, 14B and 14C depict an example of a case where the number of coincidences between an average motion vector and respective motion vectors is small;

DESCRIPTION OF EMBODIMENTS

First, in the art discussed in Patent Document 1, after the plurality of images are synthesized, the image data of an image area that has not been synthesized is corrected. Therefore, there may occur a difference between the area for which synthesis has been carried out and the area for which synthesis has not been carried out. Especially, the difference may be likely to become conspicuous for a case where a detailed image is processed. Further, the synthesized image obtained from the art discussed in the Patent Document 2 may be such that it is not sure that a further correction process is not necessary.

An embodiment aims at obtaining a more satisfactory image without carrying out a further correction process after superposition when synthesis is carried out using a plurality images.

Next, presupposition of general image stabilization by image processing will be described. In image stabilization by image processing, in order to shorten a time of photographing as much as possible, image stabilization is carried out with the minimum number of images taken through continuous shooting. It has been said that image stabilization is advantageous when continuous shooting is on the order of six images, and further carrying out of continuous shooting is preferably avoided. The reason for shortening the photographing time is to prevent a blurring amount caused by a motion of a camera from being increased during the photographing. Therefore, an effort has been commonly made for obtaining a satisfactory image while shortening the photographing time with the reduced number of images taken at continuous shooting.

On the other hand, in the respective embodiments described below, to shorten a photographing time is not a concern. This is because, in the respective embodiments, a certain number of images being able to be properly synthesized are selected from a plurality of images taken at continuous shooting, and the selected images are synthesized. Therefore, the more the number of images are taken at continuous shooting, the higher the number of combinations of images suitable for synthesis are obtained. In the respective embodiments, photographing may be finished in a case where the certain number of images being able to be properly synthesized have been able to be selected. Below, the respective embodiments based on the above-described thought will be described in detail with reference to figures.

Embodiment 1

<Configuration>

Figure 2:
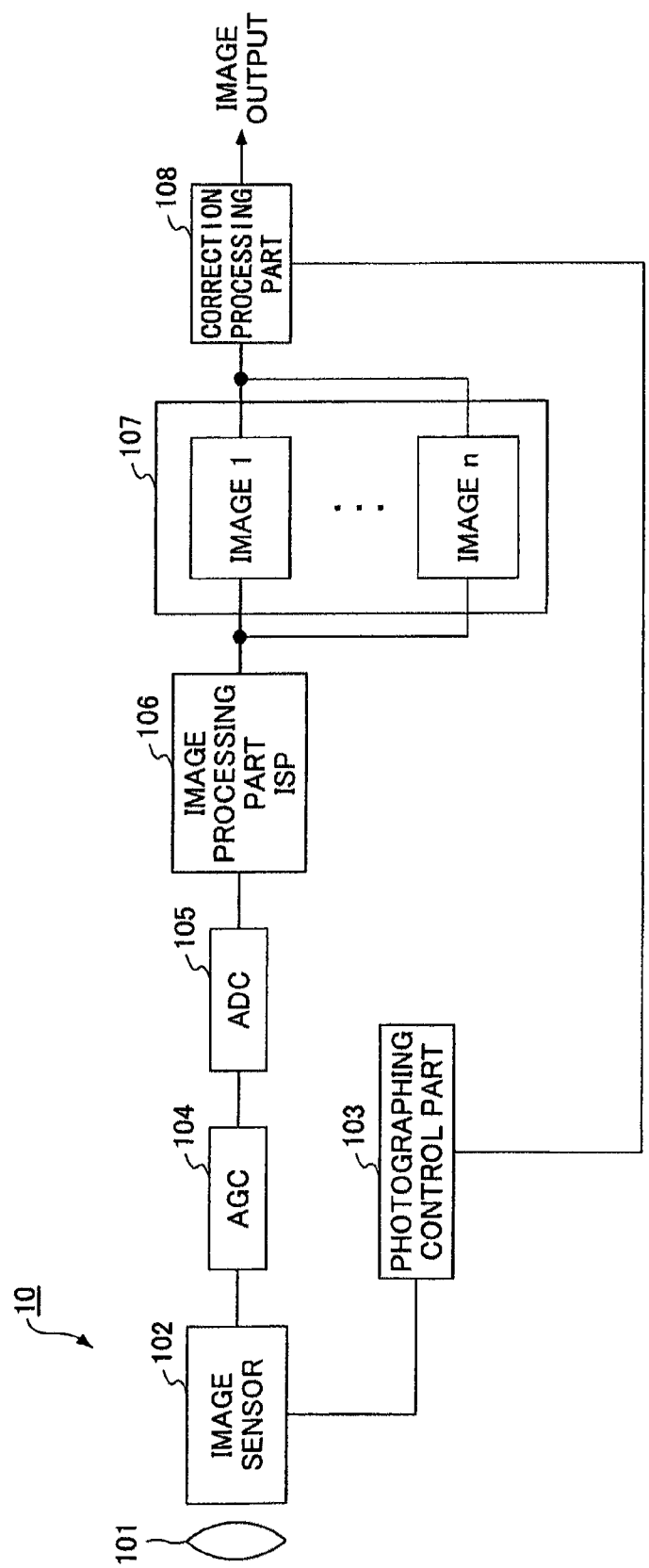
FIG. 2 depicts a block diagram of one example of a configuration of an image processing apparatus common to respective embodiments.

FIG. 2 is a block diagram depicting one example of a configuration of an image processing apparatus 10 that is common to the respective embodiments. In FIG. 2, the image processing apparatus 10 includes a lens 101, an image sensor 102, a photographing control part 103, an AGC (Automatic Gain Control) circuit 104, an AD converter (Analog to Digital converter, or "ADC") 105, an image processing part (which may be called an image signal processor (ISP)), an image storage part 107 and a correction processing part 108.

The lens 101 condenses light coming from a photographing object onto the image sensor 102. The image sensor 102 includes a light receiving part (not depicted) that carries out photoelectric conversion on the light received from the photographing object via the lens 101 into electric charges and stores the electric charges; and a signal output part (not depicted) that outputs the stored charges as photoelectric converted data.

The AGC circuit 104 controls the gain of the photoelectric converted data output from the image sensor 102.

The ADC 105 converts the (analog) photoelectric converted data for which the gain is thus controlled into a digital signal.

The image processing part 106 generates image data based on the output of the AGC 105. For example, based on the digital signal (also referred to as raw data) output from the ADC 105, the image processing part 106 carries out a color separation process, a gamma correction process for linearly expressing brightness for a display, a white balance control process for expressing white as white regardless of the temperature, and so forth. By the color separation process, the input signal is converted into a certain form such as a YUV signal or a RGB (Red Green Blue) signal.

The image processing part 106 carries out brightness adjustment on the images taken at continuous shooting, and thus, converts the images into lighter ones. For example, the image processing part 106 carries out gain adjustment such that the largest brightness values of the images become a certain brightness value, carries out the gain adjustment on the entireties of the images, and thus, carries out lightness adjustment.

The photographing control part 103 outputs a control signal including exposure control information calculated for the photographing object to the image sensor 102 in response to a photographing instruction. The image sensor 102 takes image data of a plurality of images through photographing processes (including the processes carried out by the light receiving part and the signal output part). The photographing control part 103 carries out control to finish continuous shooting when obtaining a control signal from the correction processing part 108.

The image data of the plurality of images thus taken by the image sensor 102 through the photographing processes is stored in the image storage part 107 via the AGC circuit 104, the ADC 105 and the image processing part 106.

The correction processing part 108 reads the image data of the plurality of images stored in the image storage part 107, and based thereon, generates image data of one image having undergone image stabilization (synthesis). The correction processing part 108 outputs the generated images data to an image data storage memory (not depicted) of a subsequent stage. Operations carried out by the correction processing part 108 is different between the respective embodiments described below.

In a case where continuous shooting is being carried out, the correction processing part 108 may output the control signal for finishing the photographing to the photographing control part 103 in a case where a certain condition is met. The correction processing part 108 may be mounted in a form of an image processing chip.

In a case where the photographing control part 103, the image processing part 106 and the correction processing part 108 are achieved in a form of a program(s), a CPU (Central Processing Unit) that carries out processes of the photographing control part 103 and the image processing part 106 may also be the CPU or may be separate from a CPU carrying out processes of the correction processing part 108. The processes carried out by the correction processing part 108 may be achieved in a form of an image processing program.

Figure 3:
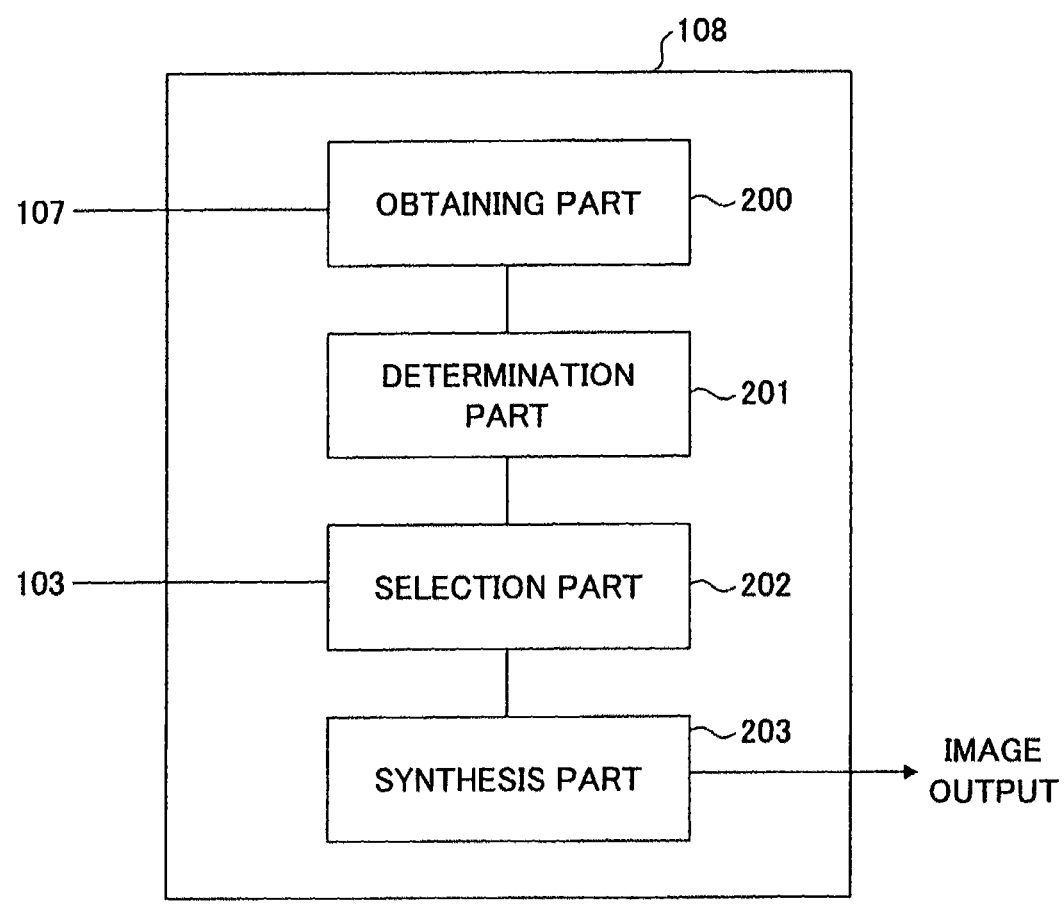
FIG. 3 depicts a block diagram of one example of a configuration of a correction processing part in an embodiment 1.

FIG. 3 is a block diagram depicting one example of a configuration of the correction processing part 108 according to the embodiment 1. As depicted in FIG. 3, the correction processing part 108 includes an obtaining part 200, a determination part 201, a selection part 202 and a synthesis part 203.

The obtaining part 200 obtains the plurality of images stored by the image storage unit 107. The obtained images are the plurality of images taken by photographing of continuous shooting, for example. Further, when obtaining the plurality of images, the obtaining part 200 may obtain, in sequence, combinations of images, each combination having a certain number of (for example, 2) images, or combinations of images, each combination having a certain number of (for example, 2) successive images.

The determination part 201 determines whether the plurality of images are suitable for superposition. A specific method of determination as to whether images are suitable for superposition will be described when a configuration (FIG. 4) of the determination part 201 will be described.

The selection part 202 selects a certain number of images that have been determined as suitable for superposition by the determination part 201. The certain number is, for example, any one of 2 through 6. The selection part 202 may output the control signal indicating to finish photographing to the photographing control part 103 when thus selecting the certain number of images. The photographing control part 103 finishes the photographing of continuous shooting in a case of receiving the control signal.

The synthesis part 203 synthesizes the certain number of images selected by the selection part 202. The synthesis part 203, for example, averages corresponding pixels in the certain number of images. Thereby, a synthetic image is generated. The synthetic image also is an image-stabilized image since as a result of thus photographing the images with the short exposure time previously at the time of photographing of continuous shooting, the motion of the camera during each exposure becomes reduced, and also, the exposure time can be consequently ensured through the synthesis of the images. Further, the synthetic image is also a noise-corrected image since the noises are averaged so that the noise becomes inconspicuous.

Figure 4:
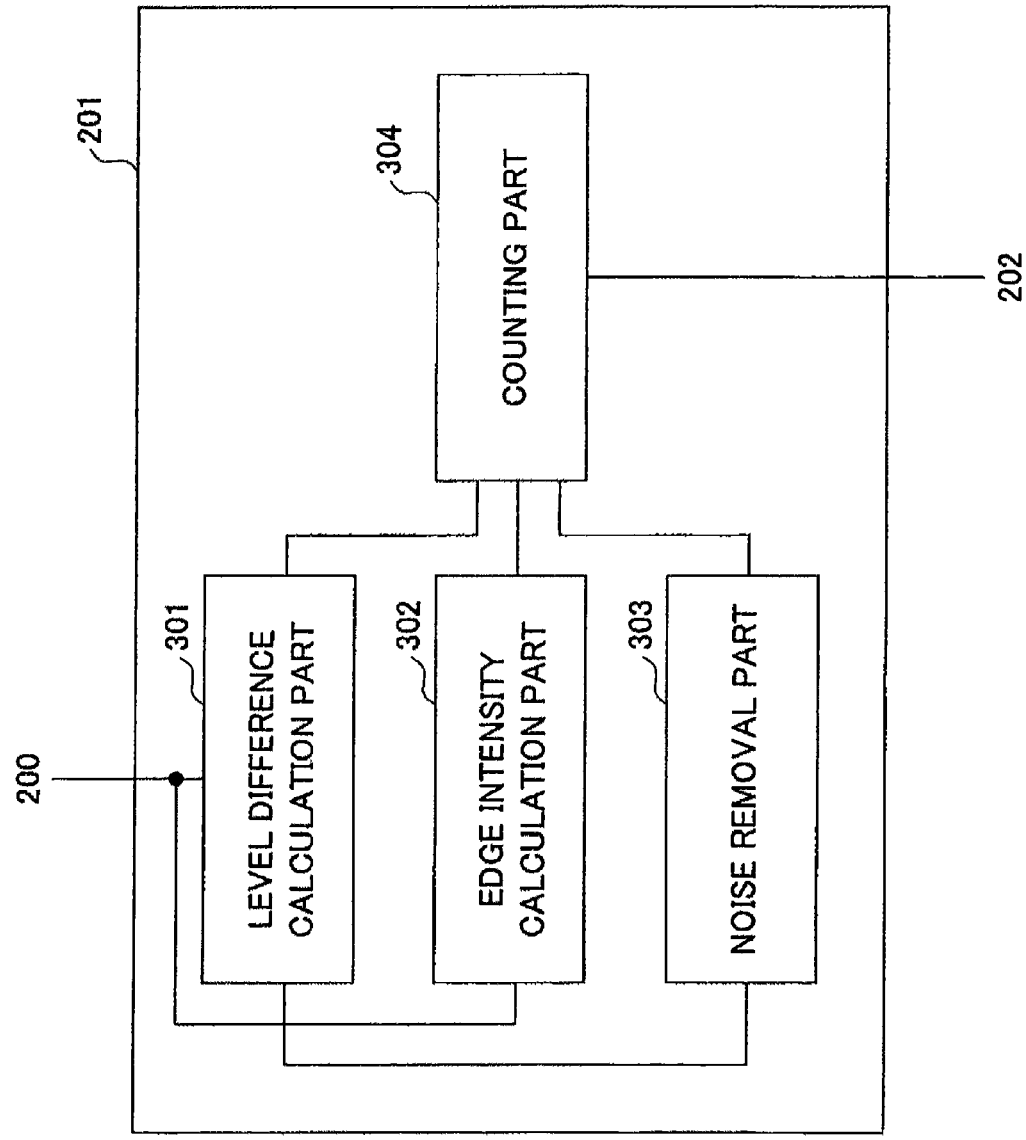
FIG. 4 depicts a block diagram of one example of a configuration of a determination part in the embodiment 1.

Next, a configuration of the determination part 201 and a determination process will be described. FIG. 4 is a block diagram depicting one example of a configuration of the determination part 201 in the embodiment 1. As depicted in FIG. 4, the determination part 201 includes a level difference calculation part 301, an edge intensity calculation part 302, a noise removal part 303 and a counting part 304. Processes of the respective elements of the determination part 201 will be described by using three determination examples, i.e., (1) determination only using level difference, (2) determination using level difference and edge intensity, and (3) determination to be carried out after removal of noise generated in distribution of level differences.

(1) Determination Only Using Level Difference:

The level difference calculation part 301 calculates a level difference in each pixel between a certain number of (for example, 2) images of the plurality of images. Generally speaking, it may be said that when an image is shifted in position, the level difference in each pixel between the image at the original position and the image after the shift increases as the shift in position increases. Therefore, it is possible to detect a shift in position between images by detecting the level difference in each pixel between the image. The level difference is, for example, a pixel difference value. The level difference calculation part 301 calculates, for example, level differences for all combinations of images, each combination being obtained from selecting two images from the plurality of images. For example, when selecting 2 images from 10 images, total $_{10}C_2$ combinations are obtained.

However, generally speaking, a likelihood that successive two images in a combination resemble each other is high. Therefore, the obtaining part 200 obtains combinations of images, each combination having successive two images, in sequence. At this time, the level difference calculation part 301 may calculate the level difference between the successive two images in each combination obtained by the obtaining part 200. For example, the level difference between the first and second images, the level difference between the second and third images, . . . are calculated in sequence. The level difference calculation part 301 outputs the calculated level differences to the counting part 304. The obtaining part 200 may obtain combinations of images, each combination having successive three or more images.

The level difference calculation part 301 calculates the level difference Δa between the respective pixels existing at corresponding positions of images 1 and 2. In a case of a color image RGB, it is assumed that each pixel value of the image 1 is $R_1, G_1, B_1$, each pixel value of the image 2 is $R_2, G_2, B_2$, and the pixel positions are x and y. Then, by the following formula (1), the level difference Δa can be calculated.

$$\Delta a = |R_1(x,y) - R_2(x,y)| + |G_1(x,y) - G_2(x,y)| + |B_1(x,y) - B_2(x,y)| \quad (1)$$

The level difference calculation part 301 outputs the level difference at each pixel position in each combination to the counting part 304.

The counting part 304 counts a case where the level difference in each pixel between the images in each combination is equal to or more than a threshold (for example, 5). The counting part 304 outputs the count value for each combination as a determination result of determination as to whether the images are suitable for superposition. When the count value is large, this means that the images are not suitable for superposition. When the count value is small, this means that the images are suitable for superposition.

The selection part 202 selects as images to be used for superposition images in the combination for which the count value obtained from the determination part 201 is smallest, for example. In this case, the certain number is assumed as 2. The certain number is not limited to 2. When the obtaining part 200 obtains 3 successive images, the certain number may be 3 or such. In a case where the certain number is 3, the counting part 304 may count, without duplication, pixels each having the level difference exceeding the threshold (for example, 5) between the first and second image or between the first and the third images of the successive 3 images. Thereby, it is possible to select images suitable for superposition without using a processing load by a simple method.

(2) Determination Using Level Difference and Edge Intensity:

The level difference calculation part 301 calculates the level difference in each pixel between the certain number of (for example, 2) images of the plurality of images, as described above. The level difference calculation part 301 outputs the calculated level difference for each pixel to the counting part 304.

The edge intensity calculation part 302 calculates edge intensity of the images obtained from the obtaining part 200. The edge intensity is a measure indicating whether a part of the image has an edge with high intensity.

Figure 5:
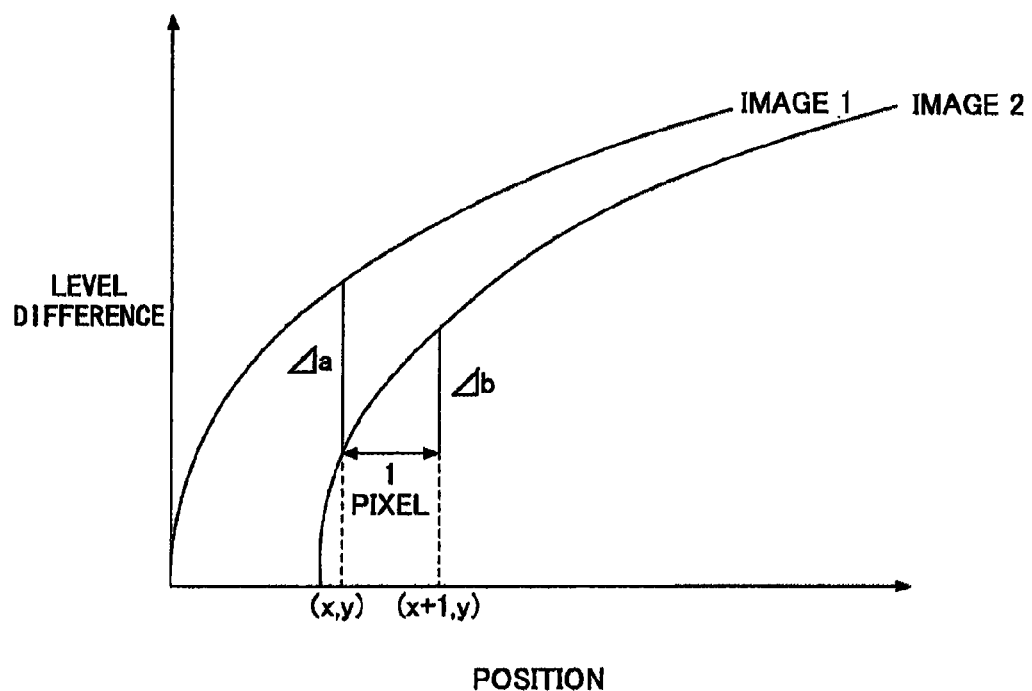
FIG. 5 illustrates a relationship between a level difference and edge intensity.

FIG. 5 illustrates a relationship between the level difference and the edge intensity. With reference to FIG. 5, the level difference and the edge intensity will now be described. It is assumed that the level difference between an image 1 and an image 2 is $\Delta a$ (the sum total of the absolute values of the differences in the RGB values), and the level difference between the pixel at a certain position (x, y) and the pixel adjacent by one pixel to the certain position (x+1, y) in the image 2 is referred to as the edge intensity $\Delta b$.

At this time, in a case where the edge intensity $\Delta b$ is large, the level difference $\Delta a$ becomes larger even when the position is shifted by a small amount. Therefore, in consideration of the edge intensity, it is possible to appropriately evaluate the level difference between the images more. For example, in a case where the edge intensity is large, the threshold is increased, and in a case where the edge intensity is small, the threshold is lowered. Thereby, it is possible to remove, from the targets of counting, pixels each having the level difference that becomes larger because the edge intensity is large.

Figure 6:
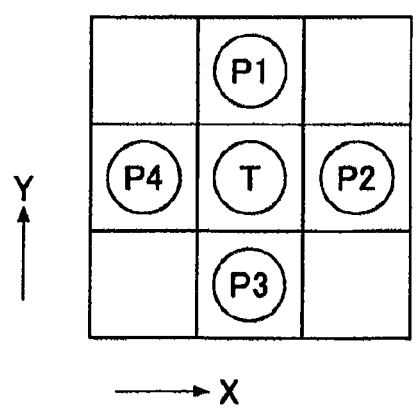
FIG. 6 depicts one example of pixels for which edge intensity calculation is carried out.

The edge intensity calculation part 302 calculates the edge intensity between a target pixel and surrounding 4 pixels. FIG. 6 depicts one example of the pixels to be used for the edge intensity calculation. As depicted in FIG. 6, a 3-by-3 pixel matrix is assumed, and the center pixel is assumed as the target pixel T. Thus, the 4 pixels P1 through P4 adjacent front and rear to the target pixel T in the respective x and y directions are used to be evaluated. The edge intensity calculation part 302 calculates the edge intensity $\Delta b$ by the following formula (2), in a case of the RGB image, and assuming that each pixel value of the image 2 is $R_2$, $G_2$, $B_2$, the position of the target pixel T is x, y, and the position of the pixels adjacent by one pixel is x+1, y.

$$\Delta b = |R_2(x+1,y) - R_2(x,y)| + |G_2(x+1,y) - G_2(x,y)| + |B_2(x+1,y) - B_2(x,y)| \quad (2)$$

The edge intensity $\Delta b$ is also a difference between adjacent pixels. The higher the edge intensity $\Delta b$ becomes, the larger the edge becomes. Further, as depicted in FIG. 6, the edge intensity $\Delta b$ is calculated for each of the four adjacent pixels P1 through P4 around the target pixel T. As the edge intensity of the target pixel T, the average of the four values of the four adjacent pixels P1 through P4 (each of the four values being the absolute value of the level difference between the target pixel T and the respective one of the four adjacent pixels P1 through P4), or such, may be used. The edge intensity calculation part 302 outputs the calculated edge intensities to the counting part 304. As to details of calculation of the edge intensity, see Japanese Patent No. 4553942.

When determining whether the level difference of each pixel is larger than the threshold, the counting part 304 changes the threshold according to the edge intensity. For example, in a case where the edge intensity is large, the counting part 304 changes the threshold to a larger value, and compares the level difference with the threshold. Thereby, it is possible to remove, from the targets of counting, pixels each having the level difference likely to become larger due to a shift in position because the pixel is at an edge part. For this purpose, the threshold may be expressed by such a function that as the edge intensity increases, the threshold increases. For this function and so forth, an appropriate formula may be obtained from an experiment or such, and may be applied. The counting part 304 outputs the count value considering the edge part to the selection part 202.

The selection part 202 selects the images in the combination having the smallest count value obtained from the counting part 204. Thereby, it is possible to select the images suitable for superposition based on the count values obtained by using the threshold that is changed in consideration of the edge part.

(3) Determination to be Carried Out after Removal of Noise Generated in Distribution of Level Differences:

The level difference calculation part 301 calculates the level difference in each pixel between the certain number of (for example, 2) images of the plurality of images, as described above. The level difference calculation part 301 outputs the calculated level difference in each pixel to the noise removal part 303.

The noise removal part 303 removes noises that are generated in a scattering manner in the images taken through the photographing of continuous shooting, by an isolated dot removal process. The noises are generated when the image taken with the short exposure time is made lighter through the brightness adjustment. When an area, where the level difference is large, is large, a likelihood that the level difference occurs due to a shift in position is high. When an area, where the level difference is large, is small, a likelihood that the level difference occurs due to the noise is high. Therefore, in a case where an area where the level difference is large is small, the noise removal part 303 causes the level difference to be removed from the targets of counting.

Figure 7A:
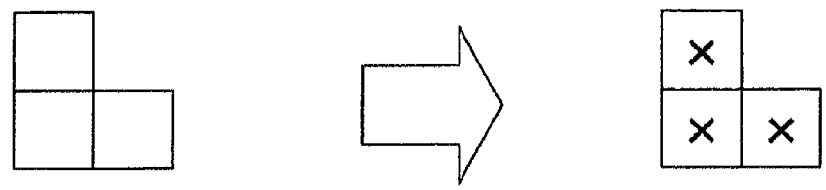
FIGS. 7A and 7B illustrate noise removal.
Figure 7B:
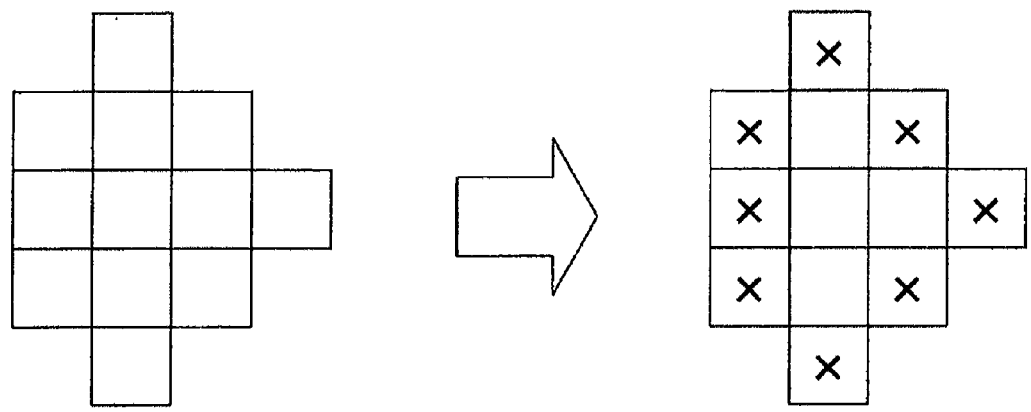

With reference to FIGS. 7A and 7B, a method of the noise removal will be described. FIGS. 7A and 7B illustrate the noise removal in the isolated dot removal process. In the example depicted in FIGS. 7A and 7B, in a case where at least one pixel having the level difference not more than the threshold is included in four pixels (up, down, right and left) of a target pixel determined to have the level difference more than the threshold (for example, 5), the noise removal part 303 turns on a flag for the pixel having the level difference not more than the threshold. The flag is indicated as "X" in this example for easy understanding. FIGS. 7A and 7B indicate only the pixels each having the level differences larger than the threshold.

FIG. 7A depicts an example of a case where an area where the level difference is large is small. As depicted in FIG. 7A, the noise removal part 303 turns on the flags "X" for the pixels each meeting the above-mentioned condition of turning on the flag. In FIG. 7A, as depicted, the flags "X" are turned on for all the pixels of the area. In this case, the noise removal part 303 reduces (for example, makes to be zero) the level differences of the pixels for which the flags are turned on, for the purpose of removing the area as being regarded as the isolated dot. Thereby, the area is caused to be not counted by the counting part 304.

FIG. 7B depicts an example of a case where an area where the level difference is large is large. As depicted in FIG. 7B, the noise removal part 303 turns on the flags "X" for the pixels each meeting the condition of turning on the flag. In FIG. 7B, there are the 4 pixels for which the flags are not turned on. The noise removal part 303 reduces the level differences for the pixels for which the flags are turned on, and causes only the pixels for which the flags have not been turned on to be counted by the counting part 304.

The counting part 304 carries out counting based on the level differences of the respective pixels after the noises are thus removed. Thereby, since the counting part 304 carries out counting based on the level differences after the noises are thus removed, a likelihood of counting only the level differences occurring purely due to the shift in position is increased. The counting part 304 outputs the count value to the selection part 202.

It is noted that the counting part 304 may change the threshold in consideration of the edge intensity calculated by the edge intensity calculation part 302, as described in "(2) Determination Using Level Difference and Edge Intensity".

Further, the noise removal part 303 may obtain from the counting part 304 the pixels having been counted because the level differences are large, carry out the isolated dot removal process on the obtained pixels, count the remaining pixels and output the count value to the selection part 202.

The selection part 202 selects the images in the combination for which the count value obtained from the counting part 304 is smallest. Thereby, it is possible to select the images suitable for superposition based on the count values obtained from counting carried out after the noise parts are removed.

The determination part 201 may carry out determination as to whether images are suitable for superposition by using any one of the determination methods (1) through (3) described above. The determination part 202 may output, for example, the count value as the determination result.

Figure 8A:
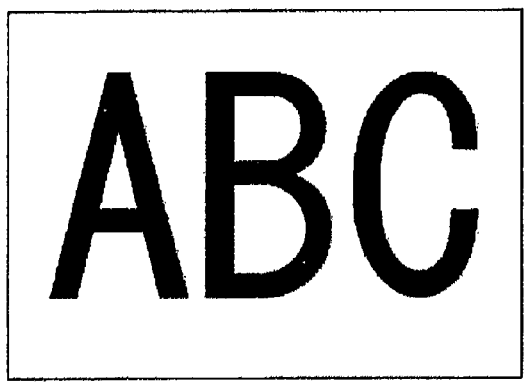
FIGS. 8A, 8B and 8C depict one example of image synthesis in the embodiment 1.
Figure 8B:
Figure 8C:
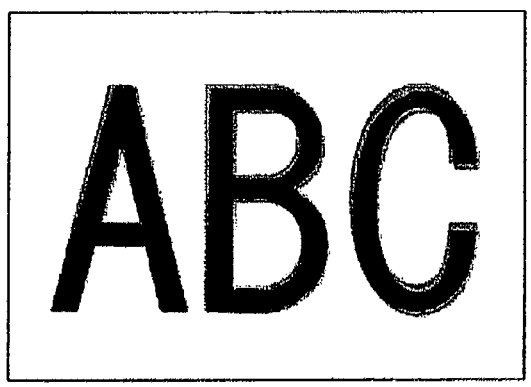

FIGS. 8A, 8B and 8C depict one example of image synthesis according to the embodiment 1. In the example depicted in FIGS. 8A, 8B and 8C, it is assumed that the determination part 202 selects the combination of image of FIG. 8A and the image of FIG. 8B as being most suitable for superposition.

The synthesis part 203 superposes the image of FIG. 8A and the image of FIG. 8B together, and generates a synthetic image. For example, the synthesis part 203 generates the synthetic image as a result of averaging the corresponding pixels between the images. FIG. 8C depicts the synthetic image. Since the synthesis part 203 synthesizes the images resembling each other taken from the plurality of images, it is possible to obtain the satisfactory synthetic image, as depicted in FIG. 8C.

<Operations>

Next, operations of the image processing apparatus 10 in the embodiment 1 will be described. FIG. 9 is a flowchart depicting one example of image processing in the embodiment 1. In step S101 of FIG. 9, the image sensor 102 obtains the photoelectric converted data with the short exposure time under the control of the photographing control part 103. The thus-obtained photoelectric converted data is stored by the image storage unit 107 after the processes described above are carried out.

In step S102, the determination part 201 obtains the plurality of images from the obtaining part 200, and carries out superposition determination on the combinations of images, each combination having the certain number of images. The plurality of images are those obtained from, for example, photographing of continuous shooting for a few seconds. The determination part 201 may use any one of the determination methods (1) through (3) described above. Processes of the superposition determination will be described below with reference to FIG. 10.

In step S103, the selection part 202 selects the combination of images that are most suitable for superposition from the combinations of images on which the determination part 201 has carried out the superposition determination. For example, the selection part 202 obtains as the determination result of the superposition determination the count values obtained through counting carried out by the determination part 201, and selects the combination of images having the smallest count value.

In step S104, the synthesis part 203 superposes the images selected by the selection part 202 together, and generates the synthetic image. The number of images to superpose is not limited to 2, and an appropriate value may be obtained from an experiment or such, and be previously set.

Thereby, instead of taking only a number of images by photographing at the start to be used for synthesis for image stabilization and generating a synthetic image, it is possible that images suitable for superposition are selected and a synthetic image is generated. In this method, an image, which has a large shift in position with respect to a certain image and thus may cause degradation of image quality, is removed from being used for superposition. Thus, it is possible to generate a satisfactory synthetic image.

Figure 10:
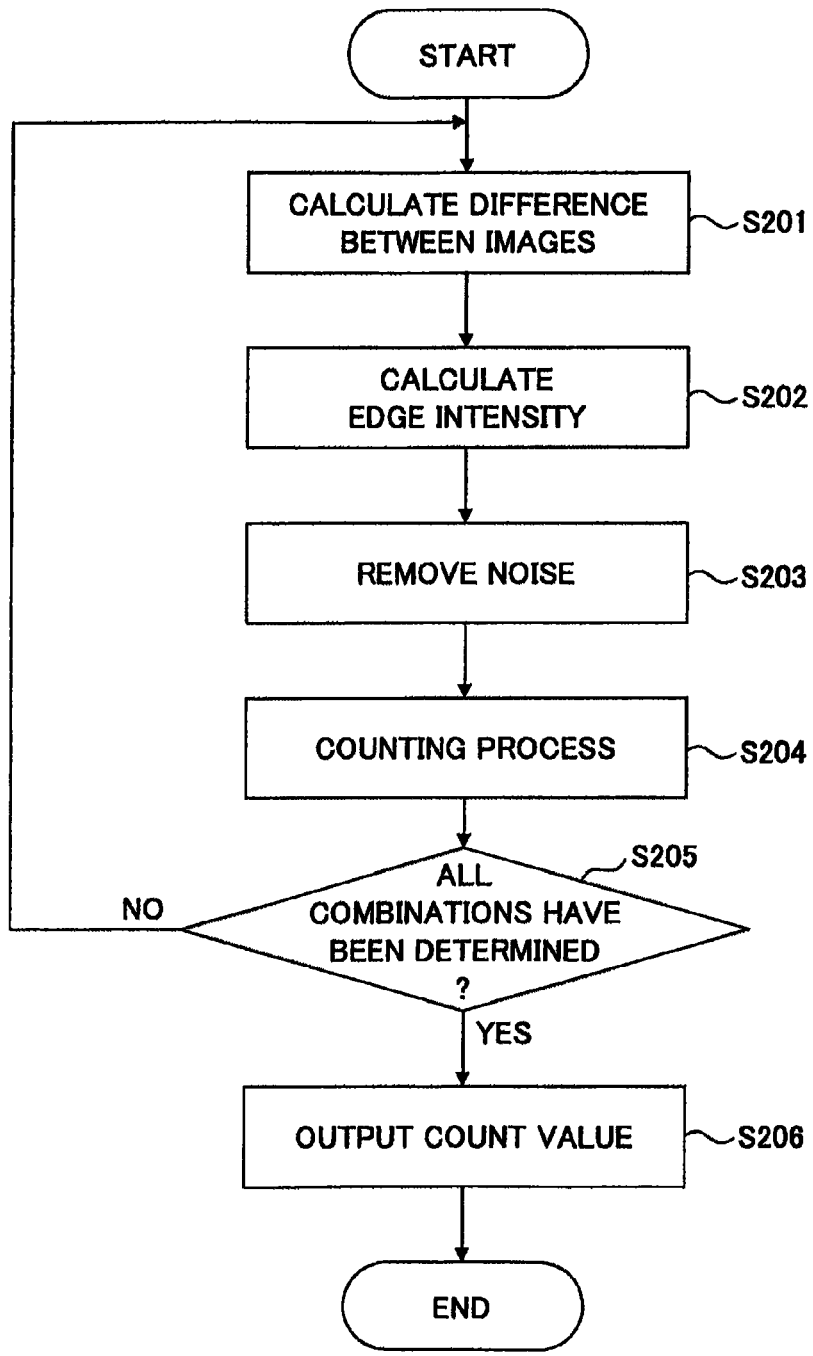
FIG. 10 is a flowchart depicting one example of superposition determination process in the embodiment 1.

FIG. 10 is a flowchart depicting one example of the superposition determination process in the embodiment 1. In the example depicted in FIG. 10, the determination method of (3) described above is used. However, the determination method of (1) or (2) described above, or another determination method, may be used instead.

In step S201, the level difference calculation part 301 calculates the level difference in each pixel between the images in one of the combinations of images.

In step S202, the edge intensity calculation part 302 calculates edge intensity by using, for example, differences in RGB values between pixels.

In step S203, as to the level difference of each pixel between the images, the noise removal part 303 determines isolated ones larger than the threshold as noises, and removes them (see FIGS. 7A and 7B). It is noted that the order between step S202 and step S203 is not limited.

In step S204, the counting part 304 counts, for each pixel, the case where the level difference in each pixel between the images obtained from the noise removal part 204 is larger than the threshold. The threshold is changed according to the edge intensity of the pixel obtained by the edge intensity calculation part 302.

In step S205, the determination part 201 determines whether the processes of steps S201 through S204 have been carried out for all the combinations of images. When the processes have been finished for all the combinations of images (step S205 YES), step S206 is then proceeded to. When the processes have not yet been finished for all the combinations of images (step S205 NO), then step S201 is returned to and the processes are carried out for another combination.

In step S206, the counting part 304 outputs the count values obtained from the counting carried out for all the combinations of images to the selection part 202. It is noted that the determination part 201 may obtain the level differences for all the combinations of the plurality of images. However, instead, the determination part 201 may obtain the level differences for only the combinations of the certain number of (for example, 2) successive images. This is because a likelihood that successive two images resemble one another is higher. Thereby, it is possible to increase the processing speed.

Thus, according to the embodiment 1, when a plurality of images are used and synthesis of images is carried out, it is possible to obtain a more satisfactory synthetic image without carrying out a correction process after superposition. Further, according to the embodiment 1, it is possible to select images suitable for superposition with a simple method by carrying out superposition determination by using only level differences between images. Further, according to the embodiment 1, it is possible to select images more suitable for superposition by carrying out comparison of the level differences using edge intensity, and carrying out superposition determination. Further, according to the embodiment 1, it is possible to determine whether the image are suitable for superposition based on precise count values obtained from noise removal. This is because in a case where an area where the level differences between the images are large meets a certain condition, the pixels having the level differences are counted.

Embodiment 2

Next, an image processing apparatus 10 in the embodiment 2 will be described. The image processing apparatus 10 in the embodiment 2 carries out position shift correction and then carries out a superposition process. Thereby, it is possible to generate a more satisfactory synthetic image.
<Configuration>

A configuration of the image processing apparatus in the embodiment 2 is similar to that of the image processing apparatus in the embodiment 1 depicted in FIG. 2. In the embodiment 2, the contents of processes of the correction processing part 108 are different from those of the embodiment 1. Therefore, below, the correction processing part 108 in the embodiment 2 will be described.

Figure 11:
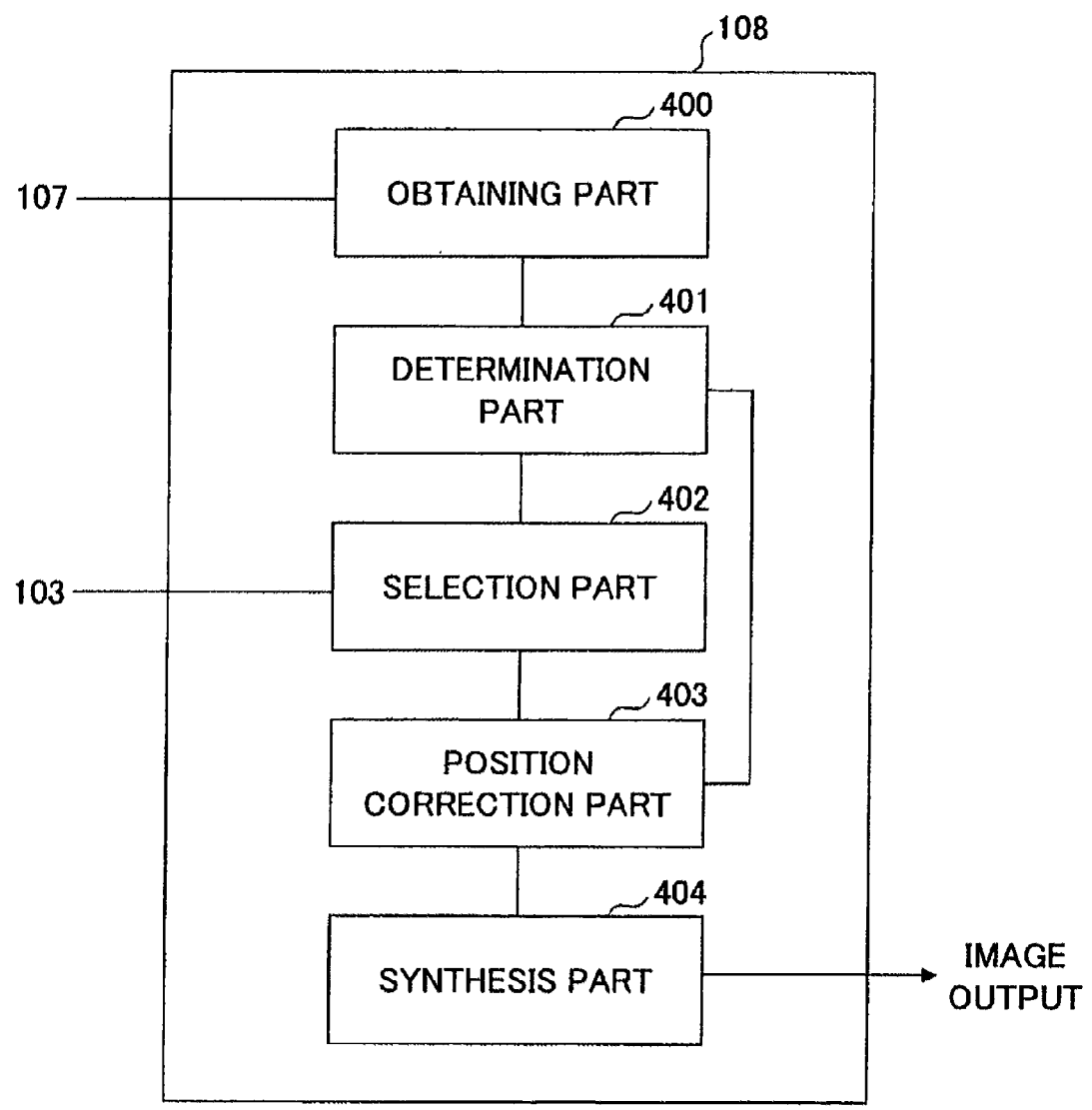
FIG. 11 depicts a block diagram of one example of a correction processing part in an embodiment 2.

FIG. 11 is a block diagram depicting one example of a configuration of the correction processing part 108 in the embodiment 2. As depicted in FIG. 11, the correction processing part 108 in the embodiment 2 includes an obtaining part 400, a determination part 401, a selection part 402, a position correction part 403 and a synthesis part 404.

The obtaining part 400 has a function the same as that of the obtaining part 200 in the embodiment 1, and therefore, the description therefor will be omitted.

The determination part 401 determines whether the plurality of images obtained by the obtaining part 400 are suitable for superposition. A specific method of determining whether the plurality of images are suitable for superposition will be described when a configuration (FIG. 12) of the determination part 401 will be described. Further, the determination part 401 carries out position shift detection (detecting a shift in position) between images of the plurality of images by obtaining motion vectors between the images. The motion vectors will be described later when "(6) determination using the number of motion vectors" will be described.

The selection part 402 selects a certain number of images determined as being suitable for superposition by the determination part 401, the same as in the embodiment 1. The selection part 402 may output the control signal indicating to finish photographing to the photographing control part 103 when having selected the certain number of images, the same as in the embodiment 1.

The position correction part 403 carries out position shift correction between the images selected by the selection part 402 by using the motion vectors between the images obtained as a result of the determination part 401 carrying out the position shift detection, as mentioned above for the determination part 401. The position shift correction may be also referred to as a position adjustment process.

The synthesis part 404 synthesizes the certain number of images selected by the selection part 402, in such a way that a certain image having undergone the position shift correction is synthesized with a certain image. For example, the synthesis part 404 averages corresponding pixels in the certain number of images.

Figure 12:
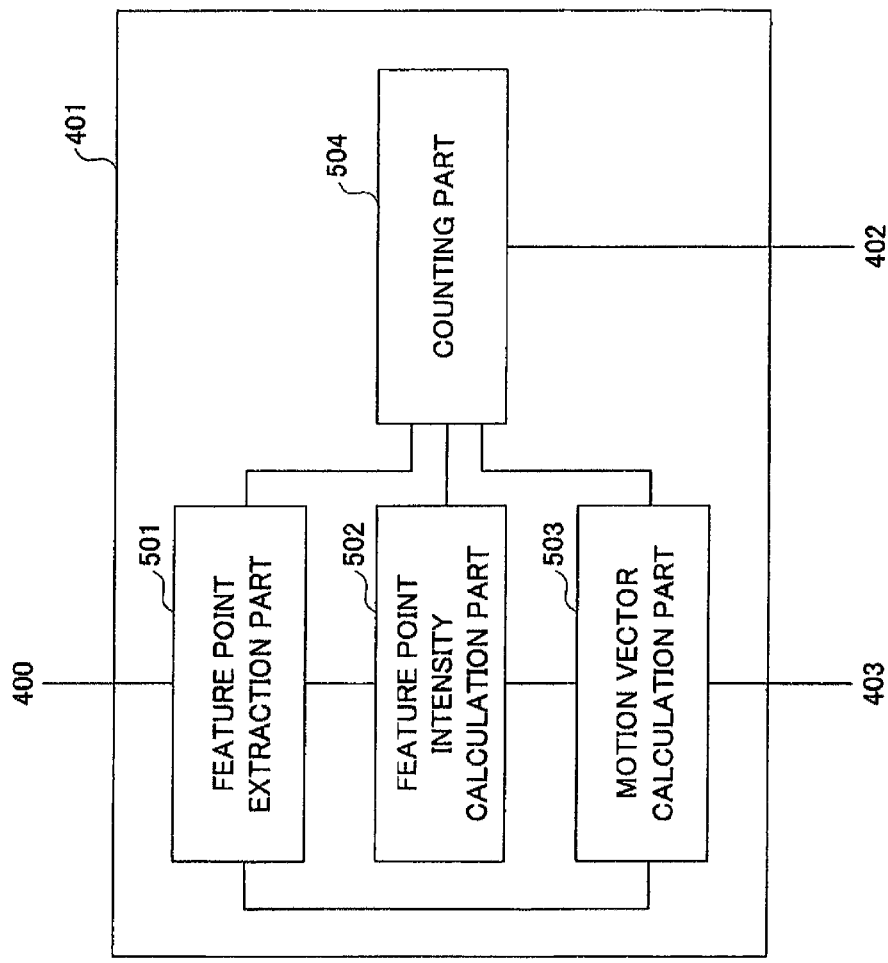
FIG. 12 depicts a block diagram of one example of a determination part in the embodiment 2.

Next, a configuration and a determination process of the determination part 401 will be described. FIG. 12 is a block diagram depicting one example of a configuration of the determination part 401. As depicted in FIG. 12, the determination part 401 includes a feature point extraction part 501, a feature point intensity calculation part 502, a motion vector calculation part 503 and a counting part 504. Processes of the respective elements of the determination part 401 will be described by using four determination examples, i.e., (4) determination using the number of feature points, (5) determination using feature point intensity, (6) determination using the number of motion vectors and (7) determination using motion vectors and average motion vector.

(4) Determination Using the Number of Feature Points:

The feature point extraction part 501 calculates feature amounts of pixels of each image, and extracts pixels each having the feature amount exceeding a threshold as feature points. The feature points are, for example, points at which a curvature of an edge is large or points at which edges intersect. For extracting the feature points, operators such as Moravec, Harris, SUSAN, and so forth, and KLT (Kaneda-Lucas-Tomasi) have been proposed. The feature point extraction part 501 extracts the feature points by using a feature point extraction method of these known arts. It is noted that the feature point extraction part 501 may use any method as long as it is possible to extract the feature points.

Figure 13:
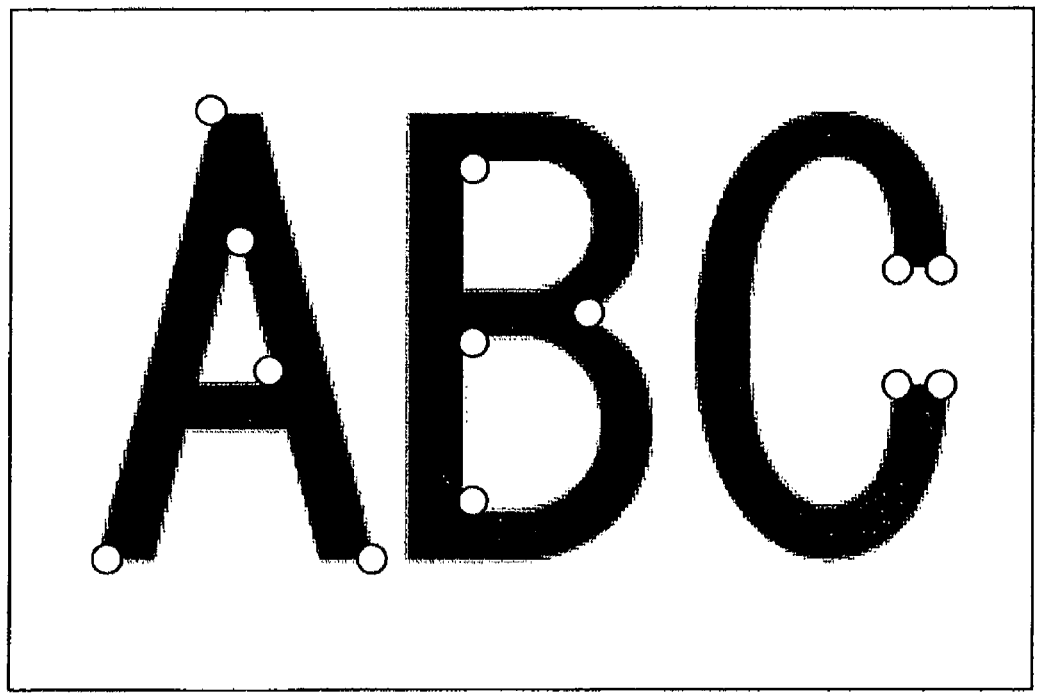
FIG. 13 illustrates one example of feature points.

FIG. 13 depicts one example of the feature points. In FIG. 13, the feature points are indicated by circles for being easily understood. As depicted in FIG. 13, corner parts or such are extracted as the feature points. The example depicted in FIG. 13 merely depicts one example of the feature points, and other points may be extracted as the feature points.

The feature point extraction part 501 outputs the extracted feature points to the counting part 504 and to the motion vector calculation part 503.

The counting part 504 counts the feature points for each image, and outputs the number of the feature points (count value) for each image to the selection part 402. The count values are used as determination results of determination as to whether the image is suitable for superposition. As the count value is larger, this means that the image is more suitable for superposition. As the count value is smaller, this means that the image is less suitable for superposition.

Based on the count values obtained from the counting part 504, the selection part 402 selects a certain number of (for example, 2) images having the count values larger than the others, as the images suitable for superposition. Since an image having many feature points is a clear image, the method of determining, only by using the number of the feature points, whether the image is suitable for superposition, is advantageous as a simple method for achieving an increase in the processing speed.

(5) Determination Using Feature Point Intensity:

As described above, the feature point extraction part 501 extracts the feature points by using any one of the feature point extraction methods described above. The feature point extraction part 501 outputs the extracted feature points to the counting part 504 and to the feature point intensity calculation part 502.

The feature point intensity calculation part 502 calculates intensities of feature amounts of the feature points obtained from the feature point extraction part 501. For example, it is possible to calculate the intensity of the feature point by, for example, creating an expected value map. Then, the feature point intensity calculation part 502 divides the feature amounts into the number of blocks the same as the number of pixels included in the expected value map, and determines the maximum value of the feature amounts in each block as an expected value of the block. It is noted that a size of the expected map is smaller than the size of the image. For example, the expected map has the size that is ¼ of the size of the image. In this case, the maximum value of the feature amounts of 4-by-4 pixels is used as the expected value of one pixel in the expected map. The expected values of the expected value map represent the feature point intensities. As to details of the method of calculating the feature point intensity, see Japanese Patent No. 4142732.

The feature point intensity calculation part 502 may cause the counting part 504 to carry out counting in such a manner that each "1" representing the number of the feature points is weighted. For example, the feature point intently calculation part 502 puts a large weight to each "1" of the number of feature points in the block of the image corresponding to the pixel having the large expected value. The feature point intensity calculation part 502 puts a small weight to each "1" of the number of feature points in the block of the image corresponding to the pixel having the small expected value. The feature point intensity calculation part 502 outputs the weighted number of the feature points to the counting part 504.

The counting part 504 counts the weighted number of the feature points for each image, and outputs the count values to the selection part 402. The count values are used as determination results of determination as to whether the images are suitable for superposition. As the count value is larger, this means that the image is more suitable for superposition. As the count value is smaller, this means that the image is less suitable for superposition.

Based on the count values of the weighted numbers of the feature points obtained from the counting part 504, the selection part 402 selects a certain number of (for example, 2) images having the count values larger than the others, as the images suitable for superposition. Thereby, the images having many feature points having the large feature amounts are likely to be selected, and thus, it is possible to select the images more suitable for superposition.

(6) Determination Using the Number of Motion Vectors:

The feature point extraction part 501 extracts the feature points using any one of the feature point extraction methods, as mentioned above. The feature point extraction part 501 outputs the extracted feature points to the counting part 504 and to the motion vector calculation part 503.

The motion vector calculation part 503 obtains the feature points extracted by the feature point extraction part 501 for each image. The motion vector calculation part 503 tracks the corresponding feature points between the two images, and calculates the motion vectors. A method of tracking the feature points is, for example, discussed in a document "Good Features to Track" (IEEE Conference on Computer Vision and Pattern Recognition, pages 593-600, 1994) written by Jianbo Shi and Carlo Tomasi.

The motion vector calculation part 503 outputs the motion vectors calculated for each image to the counting part 504 and to the position correction part 403.

The counting part 504 counts the motion vectors obtained from the motion vector calculation part 503 for each combination of images. The count values are used as determination results of determination as to whether the images are suitable for superposition. The larger the count value is, the more suitable for superposition the images are. The smaller the count value is, the less suitable for superposition the images are.

Based on the count values of the motion vectors obtained from the counting part 504, the selection part 402 selects the combination of images having the largest count value as the images suitable for superposition. Thereby, it is possible to carry out position shift correction (described later) between the images having the large numbers of the motion vectors, and carry out synthesis.

(7) Determination Using Motion Vectors and Average Motion Vector:

The feature point extraction part 501 extracts the feature points by using any one of the feature point extraction methods as described above. The feature point extraction part 501 outputs the extracted feature points to the counting part 504 and to the motion vector calculation part 503.

The motion vector calculation part 503 obtains the feature points extracted by the feature point extraction part 501 for each image. The motion vector calculation part 503 tracks the corresponding feature points between the two images, and calculates the motion vectors.

The motion vector calculation part 503 obtains for each combination of images an overall average motion vector from the calculated motion vectors. The overall average motion vector is, for example, an average of the motion vectors obtained for each combination of images. The motion vector calculation part 503 outputs the obtained average motion vector to the counting part 504 for each combination of images.

The counting part 504 counts, for each combination of images, how many motion vectors are the same as the average vector obtained from the motion vector calculation part 503. For this purpose, the counting part 504 may use the distribution of the magnitudes and the distribution of the directions of the respective motion vectors. The thus-obtained count value is output to the selection part 402. The count values are used as determination results of determination as to whether the images are suitable for superposition. The larger the count value is, the more suitable for superposition the combination of images are. The smaller the count value is, the less suitable for superposition the combination of images are.

Based on the count values of the motion vectors obtained from the counting part 504, the selection part 402 selects the combination of images having the largest count value as the images suitable for superposition. This is because the fact that each motion vector coincides with the average motion vector means that the image has carried out parallel translation. Therefore, it is easy for the position correction part 403 to carry out position adjustment on the images. A satisfactory synthetic image is obtained as a result of the images having been properly adjusted in their positions being superposed.

FIGS. 14A, 14B and 14C depict an example where a number of coincidences between the respective motion vectors and the average motion vector is small. FIG. 14A depicts the first image obtained from photographing and FIG. 14B depicts the second image obtained from photographing. As can be seen from FIGS. 14A and 14B, with respect to the first image, a shift in position including a rotation component has occurred in the second image. FIG. 14C depicts an example where the motion vectors and the average motion vector have been obtained from the image depicted in FIG. 14A and the image depicted in FIG. 14B. As depicted in FIG. 14C, the number of coincidences between the respective motion vectors my and the average motion vector MV in the entire images is small.

Figure 15A:
FIGS. 15A, 15B and 15C depict an example of a case where the number of coincidences between an average motion vector and respective motion vectors is large.
Figure 15B:
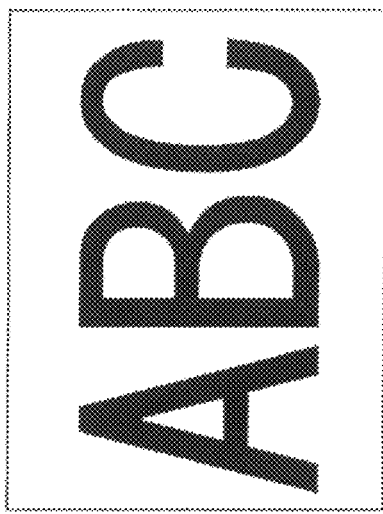
Figure 15C:
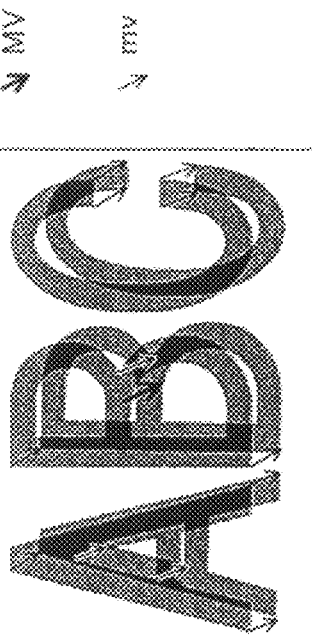

FIGS. 15A, 15B and 15C depict an example where a number of coincidences between the respective motion vectors and the average motion vector is large. FIG. 15A depicts the first image obtained from photographing and FIG. 15B depicts the second image obtained from photographing. As depicted in FIGS. 15A and 15B, with respect to the first image, a shift in position due to parallel translation has occurred in the second image. FIG. 15C depicts an example where the motion vectors and the average motion vector have been obtained from the image depicted in FIG. 15A and the image depicted in FIG. 15B. As can be seen from FIG. 15C, the number of coincidences between the respective motion vectors my and the average motion vector MV in the entire images is large. In this case, the combination of images depicted in FIGS. 15A and 15B may be selected by the selection part 402.

Figure 16A:
FIGS. 16A, 16B, 16C and 16D illustrate superposition for a case where the number of coincidences between an average motion vector and respective motion vectors is small.
Figure 16B:
Figure 16C:
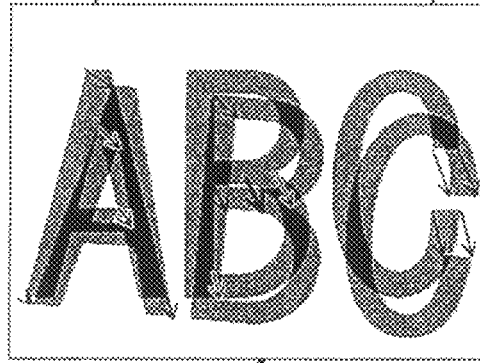
Figure 16D:
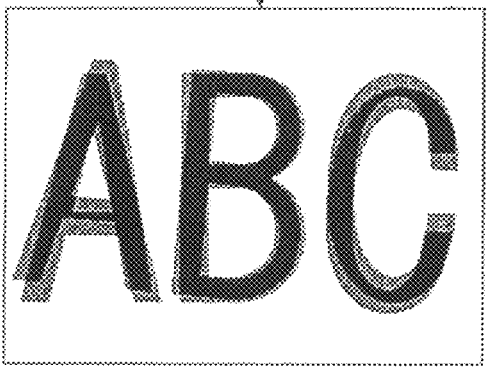

Next, an example of superposition carried out by the synthesis part 404 will be described. FIGS. 16A, 16B, 16C and 16D illustrate an example of superposition for a case where the number of coincidences between the respective motion vectors and the average motion vector is small. FIGS. 16A, 16B and 16B are similar to FIGS. 14A, 14B and 14C, respectively. FIG. 16D depicts an image obtained from superposition by the average motion vector between the images of FIG. 16A and FIG. 16B. Since the shift in position including the rotation component has occurred between the image of FIG. 16A and the image of FIG. 16B, the position correction part 403 cannot properly carry out position shift correction. As a result, the synthetic image of FIG. 16D obtained by the synthesis part 404 looks as if the boundary is blurred.

Figure 17A:
FIGS. 17A, 17B, 17C and 17D illustrate superposition for a case where the number of coincidences between an average motion vector and respective motion vectors is large.
Figure 17B:
Figure 17C:
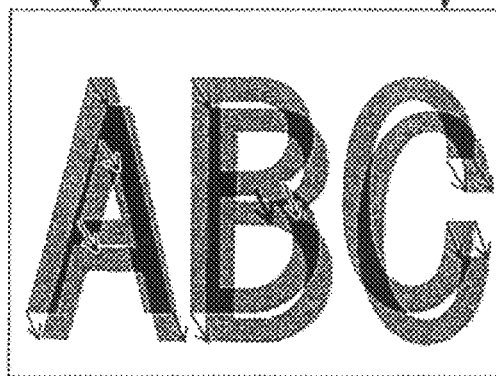
Figure 17D:
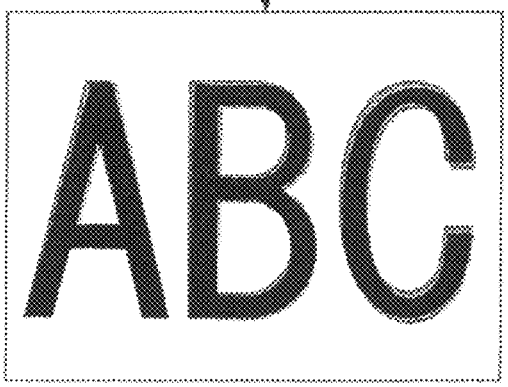

FIGS. 17A, 17B, 17C and 17D illustrate an example of superposition for a case where the number of coincidences between the respective motion vectors and the average motion vector is large. FIGS. 17A, 17B and 17C are similar to FIGS. 15A, 15B and 15C, respectively. FIG. 17D depicts an image obtained from superposition by the average motion vector between the images of FIG. 17A and FIG. 17B. Since the shift in position due to parallel translation has occurred between the images of FIGS. 17A and 17B, the position correction part 403 can properly carry out position shift correction. As a result, the synthesis part 404 can obtain the satisfactory synthetic image (see FIG. 17D).

It is noted that also in cases of using the above-described determination methods of (4) and (5), the motion vector calculation part 503 calculates the motion vectors to be used for position shift correction, and outputs the motion vectors to the position correction part 403.

<Operations>

Figure 18:
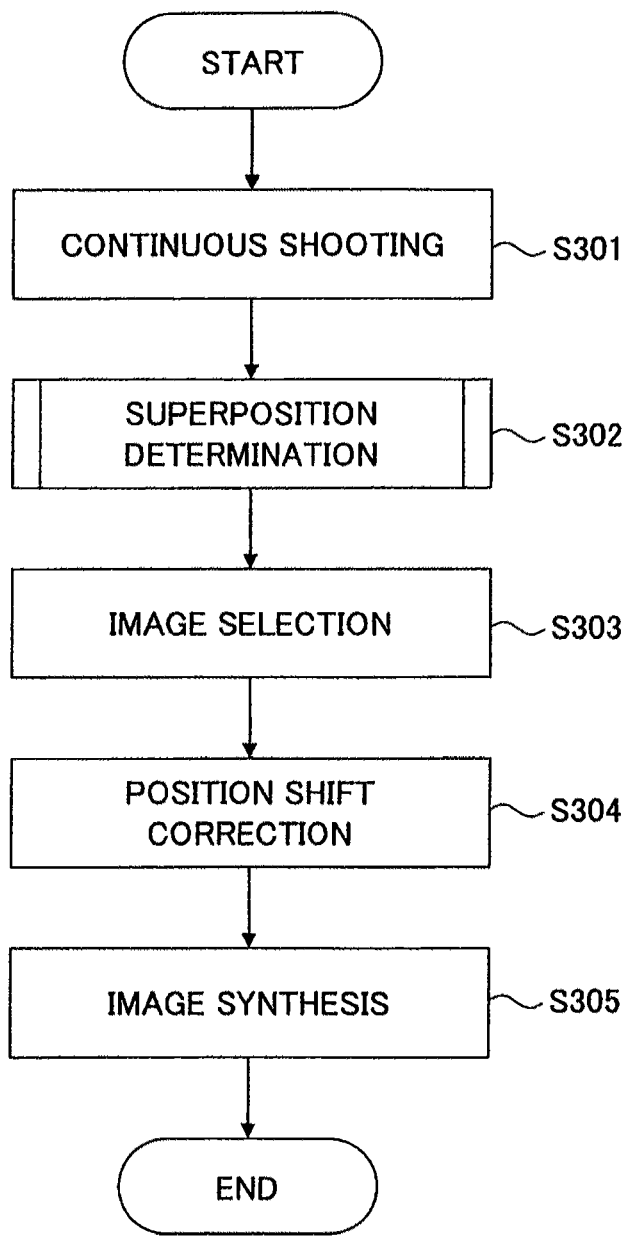
FIG. 18 is a flowchart depicting one example of image processing in the embodiment 2.

Next, operations of the image processing apparatus 10 in the embodiment 2 will be described. FIG. 18 is a flowchart depicting one example of image processing in the embodiment 2. In step S301 of FIG. 18, the image sensor 102 obtains the photoelectric converted data with the short exposure time under the control of the photographing control part 103. The thus-obtained photoelectric converted data is stored by the image storage unit 107 after the processes described above are carried out.

In step S302, the determination part 401 obtains the plurality of images from the obtaining part 400, and carries out superposition determination on the combinations of images, each combination having the certain number of images. The plurality of images are those obtained from, for example, photographing of continuous shooting for a few seconds. The determination part 401 may use any one of the determination methods (4) through (7) described above. Processes of the superposition determination will be described later with reference to FIG. 19.

In step S303, the selection part 402 selects the combination of images that are most suitable for superposition from the combinations of images for which the determination part 401 has carried out the superposition determination. For example, the selection part 402 obtains, as the determination result of the superposition determination, the count values obtained from counting carried out by the determination part 401, and selects the combination of images having the largest count value.

In step S304, the position correction part 403 carries out the position shift correction (position adjustment process) on the combination of images selected by the selection part 402.

In step S305, the synthesis part 403 superposes the combination of images selected by the selection part 202 after the position shift correction part 403 carries out the position adjustment process on the combination of images (step S304), and thus, generates the synthetic image. The number of images to superpose is, for example, 2.

Thereby, the same as in the embodiment 1, instead of generating a synthetic image by using all of a plurality of images having been taken by photographing for the purpose of image stabilization, it is possible to select images suitable for superposition, and generate a synthetic image. It is noted that in the embodiment 2, through the above-described processes, it is possible to generate a more satisfactory synthetic image since the position adjustment process is carried out and then superposition is carried out to generate the synthetic image.

Figure 19:
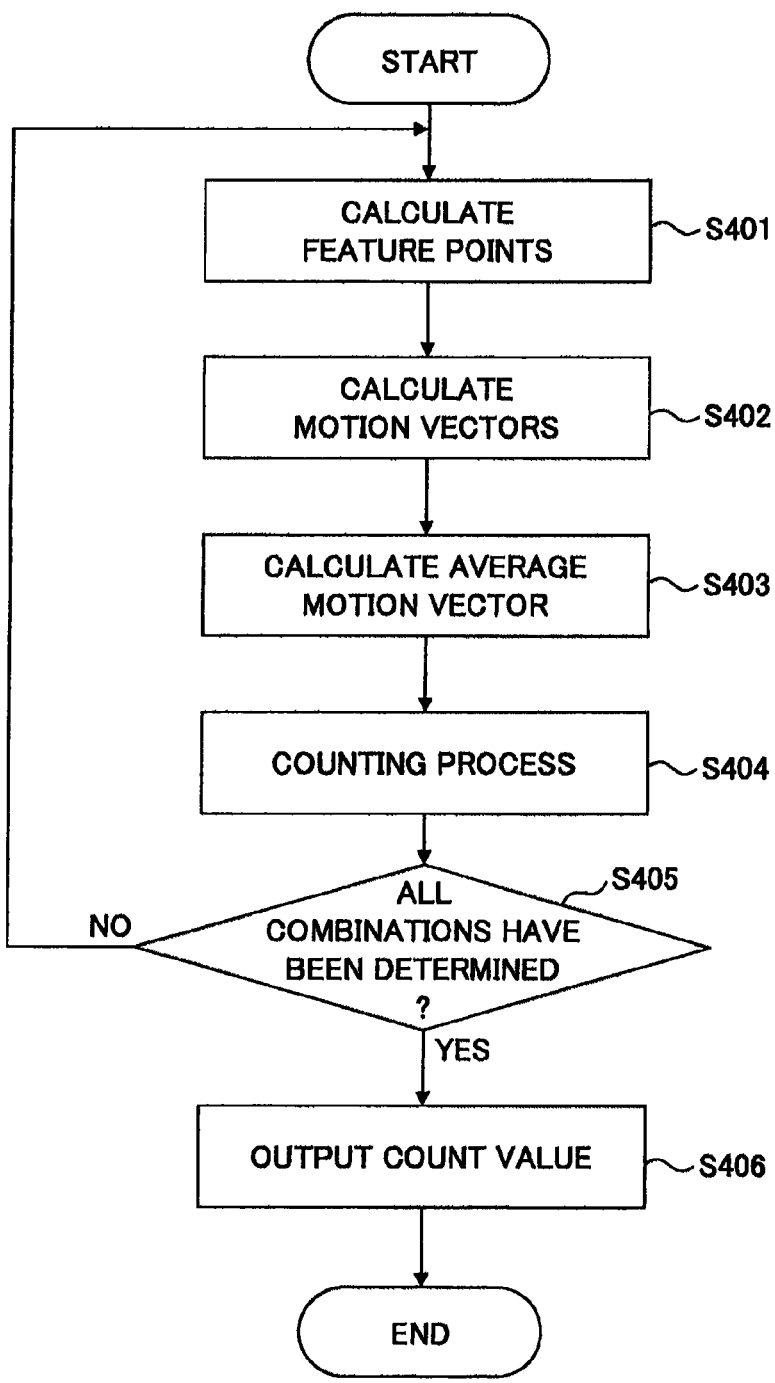
FIG. 19 is a flowchart depicting one example of a superposition determination process in the embodiment 2.

FIG. 19 is a flowchart depicting one example of the superposition determination process in the embodiment 2. In the example depicted in FIG. 19, the determination method of (7) described above is used. However, the determination method of any one of (4), (5) and (6) described above, or another determination method, may be used instead.

In step S401, for a combination of two images, the feature point extraction part 501 calculates the feature amount of each pixel, and extracts the feature points based on the feature amounts.

In step S402, the motion vector calculation part 503 carries out tracking the feature points between the two images, and calculates the motion vectors.

In step S403, the motion vector calculation part 503 obtains the average motion vector of the obtained motion vectors.

In step S404, the counting part 504 counts the number of the motion vectors each coinciding with the average motion vector.

In step S405, the determination part 401 determines whether the processes of steps S401 through S404 have been carried out for all the combinations of images. When the processes have been finished for all the combinations of images (step S405 YES), step S406 is then proceeded to. When the processes have not yet been finished for all the combinations of images (step S405 NO), then step S401 is returned to, and the processes are carried out for another combination.

In step S406, the counting part 504 outputs the count values obtained from counting carried out on all the combinations of images to the selection part 402. It is noted that the determination part 401 may carry out the determination process on all the combinations of the plurality of images. However, instead, the determination part 401 may carry out the determination process on only the combinations of the certain number of (for example, 2) successive images. This is because a likelihood that successive two images resemble one another is higher. Thereby, it is possible to increase the processing speed.

Thus, according to the embodiment 2, when a plurality of images are used and synthesis of images is carried out, it is possible to obtain a more satisfactory synthetic image by carrying out position adjustment using images that are suitable for superposition. Further, according to the embodiment 2, it is possible to select an image suitable for superposition with a simple method, by carrying out superposition determination using only the number of the feature points of the image. Further, according to the embodiment 2, it is possible to select images having many feature points having large feature amounts, by carrying out superposition determination using feature point intensity. Further, according to the embodiment 2, it is possible to select images suitable for superposition with a simple method by carrying out superposition determination using only the number of the motion vectors between the images. Further, according to the embodiment 2, it is possible to determine images, in which parallel translation has occurred, as those to be used for superposition, and thus, it is possible to generate a satisfactory synthetic image by carrying out superposition determination using the motion vectors between the images and the average motion vector.

Figure 20:
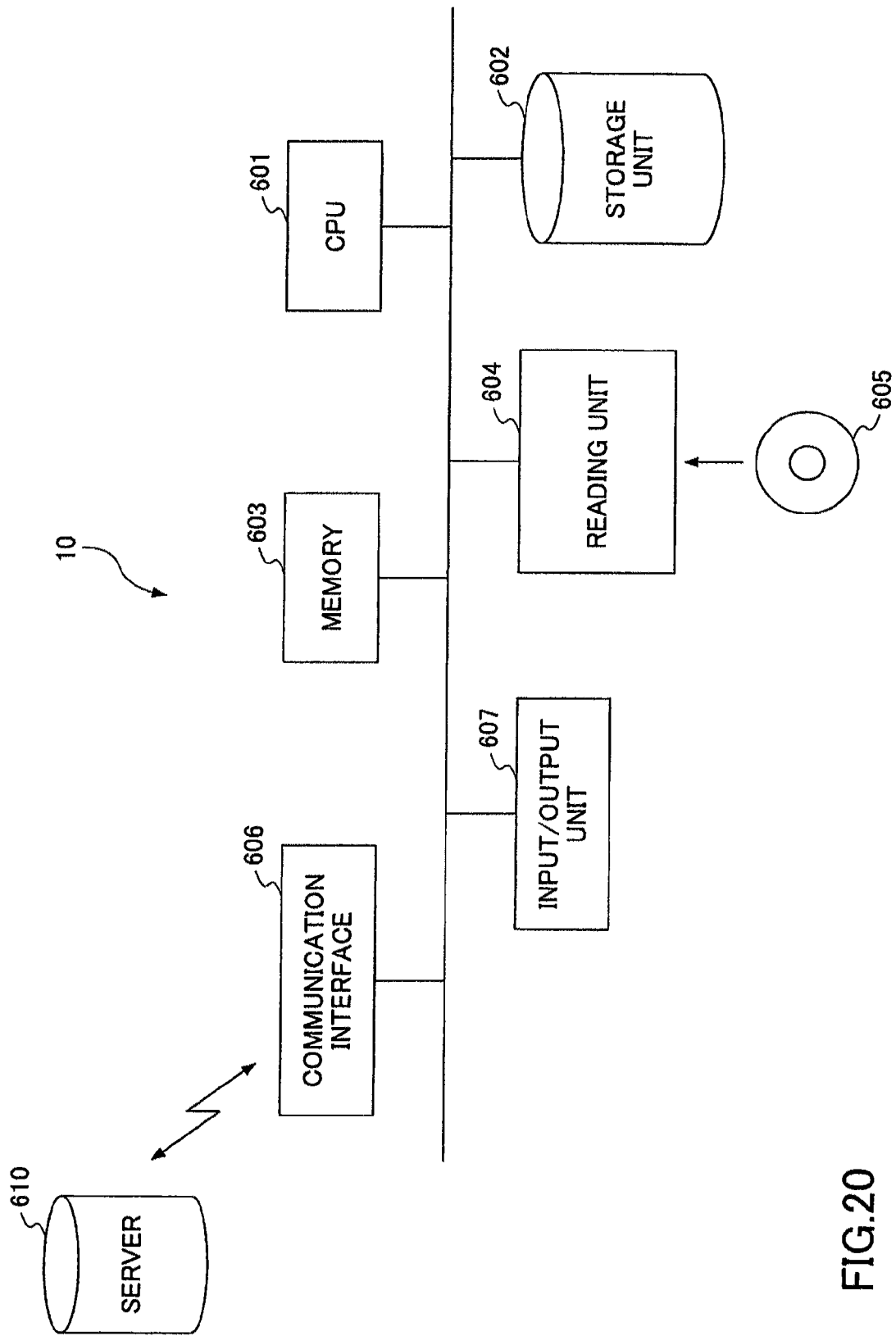
FIG. 20 depicts one example of a hardware configuration of the image processing apparatus in the embodiments 1 and 2.

FIG. 20 depicts one example of a hardware configuration of the image processing apparatus 10 in the embodiments 1 and 2. The image processing apparatus 10 depicted in FIG. 20 includes a CPU 601, a storage unit 602, a memory 603, a reading unit 604, a communication interface 606 and an input/output unit 607.

The CPU 601 carries out control of the respective units, and carries out arithmetic and logic operations on data, and modifies data. The CPU 601 carries out the image processing program by using the memory 603.

The storage unit 602 is a HDD (Hared Disk Drive) or such, stores data concerning application software or such. The storage unit 602 stores, for example, the image processing program. It is noted that the storage unit 602 may be an external storage unit.

The memory 603 includes, for example, a ROM (Read Only Memory), a RAM (Random Access Memory), and so forth. The memory 603 stores or temporarily holds programs such as an OS (Operating System) that is a basic software, application software, and so forth, which the CPU 601 executes, and data.

The reading unit 604 accesses a portable recording medium 605 according to an instruction of the CPU 601. The portable recording medium 605 is, for example, a semiconductor device (PC card or such), a medium which information is input to and output from by magnetic effect, a medium which information is input to and output from by optical effect, or such.

The communication interface 606 transmits and receives data via a communication network, according to an instruction of the CPU 601. In the above-described respective embodiments, the input/output unit 607 corresponds to a camera, a display unit, a device which receives the user's instruction, and so forth.

It is noted that in the configurations of the respective embodiments, the photographing control part 103, the image processing part 106 and the correction processing part 108 may be realized by, for example, the CPU 601 and the memory 603 used as a work memory. The image storage part 107 may be realized by, for example, the storage unit 602, the memory 603, or such. The image processing apparatus 10 may be applied to a digital camera, a cellular phone with a function of a camera, or a tablet PC (Personal Computer) with a function of a camera.

The image processing program in each of the embodiments described above may be provided in the following form.

The image processing program is previously installed in the storage unit 602.

The image processing program is provided by the portable recording medium 605.

The image processing program is downloaded from a program server 610.

As a result of the image processing apparatus 10 configured as described above executing the image processing program, the image processing apparatus in each embodiment is realized.

Variant Embodiment

In the above-described embodiment, the description has been made assuming that for position shift correction, a parallel translation component is detected. However, the determination part and the position correction part may detect a rotation component and/or an enlargement/reduction component.

For example, affine transformation carrying out image transformation according to a rotation angle and/or an enlargement/reduction ratio is carried out. The affine transformation is carried out by the following formula (3):

$$\begin{pmatrix} x' \\ y' \\ 1 \end{pmatrix} = \begin{pmatrix} S\cos\theta & -S\sin\theta & dx \\ S\sin\theta & S\cos\theta & dy \\ 0 & 0 & 1 \end{pmatrix} \begin{pmatrix} x \\ y \\ 1 \end{pmatrix} \quad (3)$$

In the formula (3), "dx" denotes a shift amount in a horizontal direction, "dy" denotes a shift amount in a vertical direction, and "θ" denotes a rotation angle, i.e., a shift in a rolling direction of the camera. "S" denotes an enlargement/reduction ratio occurring when the camera is moved in far or near direction. (x, y) denote a coordinate of an pixel before the transformation, and (x', y') denote a coordinate of the pixel after the transformation. As to details of a technique of image synthesis by carrying out the affine transformation, see Japanese Laid-Open Patent Application No. 2010-232710.

Further, a technique of separating the parallel translation component, the rotation component and the enlargement/reduction component with high accuracy may be used. The technique extracts first and second feature points at positions symmetrical with respect to the center in a first image, and searches for the first and second feature points in a second image. In this technique, next, a shift amount is detected by using the coordinates of the first and second feature points extracted from the first image and the coordinates of the first and second feature points obtained through the search from in the second image. As to details of this technique, see International Publication Pamphlet No. WO 2010/100677.

By calculating the rotation component, for example, the motion vector calculation part 503 may output the average motion vector to the counting part 504 after adding the calculated rotation component to the average motion vector. Specifically, in the formula (3), "0" may be set as "dx" and "dy", and the motion vectors obtained after the coordinates of the pixels of one image have been thus corrected with respect to only θ and S may be used to obtain the average motion vector. Thereby, the counting part 504 can count the number of coincidences between the average motion vector considering the rotation component and the respective motion vectors. Therefore, the selection part 402 can select the combination of images having the rotation component as those suitable for superposition.

Further, in each embodiment, for the purpose of carrying out image stabilization, the plurality of images obtained from continuous shooting are used. However, it is also possible to apply the feature of each embodiment for a case where a certain number of images suitable for superposition are selected from a plurality of images, taken by photographing not of continuous shooting, stored in a storage unit.

Further, it is possible to use more resembling images as those for superposition, by applying the embodiment 1 between the images for which the position adjustment according to the embodiment 2 has been carried out.

Further, for each embodiment, the description has been made that synthesis of images is carried out after the respective images taken by photographing with a short exposure time may be made lighter. However, it is also possible to apply features of each embodiment to a technique in which a lighter image is obtained from image synthesis as a result of a plurality of images taken by photographing with a short exposure time being added together. In this case, instead of simply adding the dark images together, it is preferable that the plurality of images are added together after brightness adjustment to not exceed a maximum brightness value.

The image processing apparatus in each of the embodiments described above may be used for photographing a document and obtaining an image thereof with which it is possible to precisely understand the contents of the document. That is, the user photographs the document for a certain time period by using the image processing apparatus. At this time, a synthetic image having satisfactory image quality is generated. Therefore, it is possible to use the image as a photocopy of the document by storing the synthetic image after transforming it into a PDF (Portable Document Format) or such. When the above-described photographing according to each of the embodiments is used as one of photographing modes, it is considered that the user who selects this photographing mode hopes rather to obtain an image having satisfactory image quality than to photograph within a short time period.

The image processing apparatus according to each of the embodiments is capable of obtaining tens of images by continuous shooting within seconds. Therefore, it is possible to generate a synthetic image having satisfactory image quality, by selecting images suitable for superposing and synthesizing the selected images.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that various changes, substitutions, and alterations could be made hereto without departing from the spirit and scope of the invention.

What is claimed is:

1. An image processing apparatus comprising:
    a photographing part configured to photograph a photographing object;
    an obtaining part configured to obtain a plurality of images including the photographing object photographed by the photographing part;
    a determination part configured to determine whether a certain number of images included in each of a plurality of combinations of images are suitable for being superposed;
    a selection part configured to select one combination from the plurality of combinations of images determined to be suitable for being superposed; and
    a synthesis part configured to synthesize the certain number of images included in the one combination selected by the selection part,
    wherein the determination part is configured to determine whether the certain number of images are suitable for being superposed by obtaining a level difference at each position of pixels included in the plurality of combinations of images and comparing the level difference with a threshold, and
    wherein the threshold is changed according to an edge intensity between adjacent pixels of the pixels included in the plurality of combinations of images.

2. The image processing apparatus as claimed in claim 1, wherein
    in a case where the certain number of images are selected, the selection part is configured to output a control signal for finishing photographing of the photographing object to the photographing part.

3. The image processing apparatus as claimed in claim 1, wherein
    the determination part is configured to obtain a level difference between a first pixel in the first image and a second pixel in the second image at a position corresponding to a position of the first pixel, and count the number of pixels whose level difference is larger than a threshold that is changed according to an edge intensity between of the first image and the second image, and
    the selection part is configured to select the certain number of images based on the number of pixels that are counted by the determination part.

4. The image processing apparatus as claimed in claim 3, wherein
    the determination part is configured to carry out a separate dot removal process on each of pixels having the level difference larger than the threshold, and then carry out counting.

5. The image processing apparatus as claimed in claim 1, wherein
    the determination part is configured to detect the shift in position between the first image and the second image, extracts feature points of the images, and determine whether the first image is suitable for superposition based on an extraction result.

6. The image processing apparatus as claimed in claim 5, wherein
    the determination part is configured to count the number of the feature points, and
    the selection part is configured to select the certain number of images based on a count value obtained from the counting carried out by the determination part.

7. The image processing apparatus as claimed in claim 5, wherein
    the determination part is configured to calculate intensities of the feature points, and carries out counting on the feature points that are weighted by the intensities, and the selection part is configured to select the certain number of images based on a count value obtained from the counting carried out by the determination part.

8. The image processing apparatus as claimed in claim 5, wherein the determination part is configured to obtain motion vectors of the feature points between the first image and the second image, and count the number of the motion vectors, and the selection part is configured to select the certain number of images based on a count value obtained from the counting carried out by the determination part.

9. The image processing apparatus as claimed in claim 5, wherein based on a plurality of feature points in the first image and a plurality of feature points in the second image, the determination part is configured to calculate respective motion vectors of the plurality of feature points, and carry out determination based on a distribution of magnitudes and a distribution of directions of the respective motion vectors.

10. The image processing apparatus as claimed in claim 5, wherein the determination part is configured to calculate motion vectors of the feature points between the images, and an average motion vector that is an average of the motion vectors, and count the number of coincidences between the average motion vector and the motion vectors, and the selection part is configured to select the certain number of images based on a count value obtained from counting carried out by the determination part.

11. An image processing method in an image processing apparatus comprising:

obtaining a plurality of images including a photographing object photographed by a photographing part;

determining whether a certain number of images included in each of a plurality of combinations of images are suitable for being superposed;

selecting one combination from the plurality of combinations of images determined to be suitable for being superposed; and synthesizing the certain number of images included in the one combination selected by the selecting, wherein the determining determines whether the certain number of images are suitable for being superposed by obtaining a level difference at each position of pixels included in the plurality of combinations of images and comparing the level difference with a threshold, and wherein the threshold is changed according to an edge intensity between adjacent pixels of the pixels included in the plurality of combinations of images.

12. A computer readable information non-transitory recording medium tangibly embodying an image processing program which, when executed by a computer processor, performs an image processing method used by an image processing apparatus, the method comprising:

obtaining a plurality of images including a photographing object photographed by a photographing part;

determining whether a certain number of images included in each of a plurality of combinations of images are suitable for being superposed;

selecting one combination from the plurality of combinations of images determined to be suitable for being superposed; and synthesizing the certain number of images included in the one combination selected by the selecting, wherein the determining determines whether the certain number of images are suitable for being superposed by obtaining a level difference at each position of pixels included in the plurality of combinations of images and comparing the level difference with a threshold, and wherein the threshold is changed according to an edge intensity between adjacent pixels of the pixels included in the plurality of combinations of images.

13. The image processing apparatus as claimed in claim 1, wherein the certain number of images included in the one combination includes non-successive images.

14. The method as claimed in claim 11, wherein the certain number of images included in the one combination includes non-successive images.

15. The method as claimed in claim 12, wherein the certain number of images included in the one combination includes non-successive images.

* * * * *